US005619620A

United States Patent [19]

Eccles

[11] Patent Number: 5,619,620

[45] Date of Patent: Apr. 8, 1997

[54] NEURAL NETWORK FOR BANKNOTE RECOGNITION AND AUTHENTICATION

[75] Inventor: Nicholas J. Eccles, Edinburgh, Scotland

[73] Assignee: AT&T Global Information Solutions Company, Dayton, Ohio

[21] Appl. No.: 265,473

[22] Filed: Jun. 24, 1994

[30] Foreign Application Priority Data

Dec. 24, 1993 [GB] United Kingdom .................. 9326440

[51] Int. Cl.[6] .............................. G06E 1/00; G06E 3/00; G06F 15/18; G06G 7/00

[52] U.S. Cl. ................................ 395/24; 395/21; 382/158

[58] Field of Search ................................ 395/21, 23, 24, 395/26, 27; 382/155, 156, 157, 158, 159

[56] References Cited

U.S. PATENT DOCUMENTS

| | | | |
|---|---|---|---|
| 5,276,772 | 1/1994 | Wang et al. | 395/27 |
| 5,422,983 | 6/1995 | Castelaz et al. | 395/24 |
| 5,479,574 | 12/1995 | Glier et al. | 395/23 |

OTHER PUBLICATIONS

Specht, Donald F. "Probabilistic Neural Networks and the Polynomial Adaline as Complementary Techniques for Classification." IEEE Trans. on Neural Networks. vol. 1, No. 1. Mar. 1990.

*Primary Examiner*—Tariq R. Hafiz
*Attorney, Agent, or Firm*—Michael Chan; Albert L. Sessler, Jr.

[57] ABSTRACT

A probabilistic neural network (PNN) comprises a layer L1 of input nodes, a layer L2 of exemplar nodes, a layer L3 of primary Parzen nodes, a layer L4 of sum nodes, and optionally a layer L5 of output nodes. Each exemplar node determines the degree of match between a respective exemplar vector and an input vector and feeds a respective primary Parzen node. The exemplar and primary Parzen nodes are grouped into design classes, with a sum node for each class which combines the outputs of the primary Parzen nodes for that class and feeds a corresponding output node. The network includes for each primary Parzen node (e.g. L3-2-3P) for the design classes a secondary Parzen node (L3-2-3S), the secondary Parzen nodes all feeding a null class sum node (L4-0). Each secondary Parzen node has a Parzen function with a lower peak amplitude and a broader spread than the corresponding primary Parzen node, and is fed from the exemplar node for that primary Parzen node. The secondary Parzen nodes in effect detect input vectors which are "sufficiently different" from the design classes—that is, null class vectors. The network is applicable to banknote recognition and authentication, the null class corresponding to counterfeit banknotes.

7 Claims, 4 Drawing Sheets

NEURAL NETWORK FOR BANKNOTE RECOGNITION AND AUTHENTICATION

BACKGROUND OF THE INVENTION

The present invention relates to neural networks, and to banknote authentication systems using such networks.

Automatic machines which accept banknotes are coming into increasing use. These machines recognize banknotes fed to them; that is, they identify the design or value of the banknotes. It is extremely important for such machines to authenticate the banknotes; that is, to distinguish between real and counterfeit notes. In general, authentication is more difficult than recognition, since the different designs or values are deliberately designed to be readily distinguished, while forgeries are deliberately intended to be indistinguishable from genuine banknotes.

The mechanical techniques used for coin authentication are generally inapplicable to banknote authentication, for which different techniques, primarily optical, have therefore been developed. These techniques generally look at a number of features of the note being inspected, and produce a set of signals which are then matched against a standard set.

All notes start off in good condition, when they are first issued. As they circulate in use, they will tend to become worn in various ways; for example, they can be creased, their corners can become dog-eared, they can be written on and they can become dirty and stained in various ways. The features which are used by the techniques for note authentication will therefore tend to vary slightly from the ideal values. The authentication techniques should therefore incorporate a moderate degree of tolerance, otherwise the rejection rate for valid notes will be too high and customer dissatisfaction will become unacceptable. On the other hand, it is clearly extremely important that the authentication techniques should detect and reject forgeries with a high degree of reliability.

Banknotes are not designed primarily for use with automatic identification techniques. The features which are used for identification by such techniques therefore have to be chosen on an empirical basis. This means that there is generally no simple algorithm by which these features can be combined to determine whether or not a note is valid. In these circumstances, one suitable technique for determining whether or not a note is valid is to use some form of neural network.

Essentially, a neural network is a network of cells or nodes, arranged in a number of layers. The nodes of each layer are fed from the nodes of the previous layer, with the nodes of the first layer being fed with the raw input signals. In each layer, all the nodes perform broadly the same function on their input signals, but the function may be subject to variation in response to various parameters, and there is often a unique set of input signals to each node. The parameters may be different for the different nodes, and may be adjustable in various possible ways to "train" the network.

A probabilistic neural network (PNN) is disclosed in articles by Donald F Specht. The theory underlying the PNN network is based on Bayes probability theory and decision strategy, hence the term "probabilistic"; the network itself is deterministic. The above-mentioned articles are:

"Probabilistic Neural Networks", Donald F. Specht, Neural Networks, Vol 3, 1990, pp 109–118; and "Probabilistic Neural Networks and the Polynomial Adaline as Complementary Techniques for Classification", Donald F. Specht, IEE Transactions on Neural Networks, Vol 1, No. 1, March 1990, pp 111–121.

For present purposes, a PNN network, as described by Specht, can be summarized as follows. This PNN network includes first, second and third layers. The first layer consists merely of source signal distributors; each node in this layer is fed with a different input signal, and merely passes that signal on to all the nodes in the second layer. The second layer consists of pattern nodes; these are divided into groups, one group for each category or class into which the system classifies the patterns. Each pattern node performs a weighted summation of the input signals and generates an exponential function of the weighted sum. The third layer consists of summation nodes; each summation node is fed with the outputs of a different group of pattern nodes, and simply sums those outputs.

The outputs of the third layer are a set of signals, one signal from each summation node, each of which can be regarded as the probability that the set of input signals belongs to the class for that summation node. These signals will generally be subjected to further processing, in a fourth layer. The simplest form of this fourth layer merely determines and selects the largest of these signals, but more elaborate arrangements, such as selecting the largest signal only if that exceeds the next largest signal by some suitable margin, may also be used.

It should be noted that the Specht output layer is slightly different from this. In the basic Specht circuit, the final layer consists of a single output node fed from two summation nodes and forming a weighted sum of its two inputs (one weight being negative), and generates a 0 or a 1 depending on the sign of the weighted sum. This PNN circuit makes a single binary decision, whether or not the input pattern belongs to a particular type. Specht extends this to include additional pairs of sum nodes, each pair with its output node; the sum nodes of all pairs are fed from the same pattern nodes (in different combinations, of course). Each of these output nodes thus determines whether the input signal belongs to a particular type, independent of the types defined by the other output nodes.

The pattern node layer may be regarded as divided into two sublayers, a weighted sum sublayer and an exponentiation sublayer. The PNN then consists of four or five layers, which can conveniently be termed the input layer, the exemplar (or weighted sum) layer, the Parzen (or exponentiation)layer, the sum (or class) layer, and (if present) the output layer. The Parzen layer is formed of a plurality of Parzen nodes. By a Parzen node herein is meant a node which has a single input and a single output and which effects a non-linear transformation on an input value applied on the input, such that the node provides a maximum value on the output when its input value is zero, the output decreasing monotonically with increasing input. An example of a suitable non-linear transformation is an exponential function, as will be explained in more detail hereinafter.

The critical feature of the PNN network is the pattern node layer, ie the exemplar and Parzen layers. The exemplar layer can be described in terms of vectors; if the set of input signals, is regarded as an input vector and the set of weights is regarded as a weight vector, each node in the exemplar layer forms the dot product of these two vectors. As will be seen later, the weights vector can also be termed an exemplar vector. If, as is convenient, the vectors are both taken as column vectors, then the transpose of the first must be taken to obtain the dot product. In the Parzen layer, each node forms an exponential function of the output of the corresponding node in the exemplar layer.

The exponentiation function of the Parzen layer is known as a Parzen kernel or window, and also as a Parzen or activation function. This is formulated in such a way that the input signal is a measure of the similarity of the input and exemplar vectors, and decreases from a maximum as the dissimilarity increases, so that the output of the exponentiation node decreases as the dissimilarity increases. The Specht articles noted above give several possible Parzen functions.

A neural network must of course have its parameters set appropriately so that it will recognize the desired patterns. This is often referred to as "training" the network. In the PNN network, there are adjustable parameters in the exemplar, exponentiation, and sum (class) layers. In some types of neural network, training involves applying suitable training inputs and adjusting the parameters in dependence on the resulting network outputs; it should be noted that with the possible exception of the class layer, the parameters of the PNN network are set without reference to the outputs.

Neural networks are sometimes described in analog terms; the signals are then regarded as continuously variable, and the nodes are described in terms of devices which add, multiply, and so on. It will however be realized that neural networks can be implemented by digital technology, with the variables being represented as multi-bit numbers and being manipulated by digital adders, multipliers, etc.

The PNN network is designed to assign an unknown input vector to one of a set of classes, and each class is defined by means of a set of "ideal" vectors or exemplars (ie exemplar vectors). There are preferably at least several exemplars for each class.

If applied to banknote identification, there will be a separate class for each denomination of note, and for each different design of note with the same denomination. It may also be convenient to regard each different denomination as consisting of four distinct designs, corresponding to the four orientations in which a note may be inserted into a note accepting machine. The exemplars for a given class will, subject to possible normalization, consist of the vectors obtained from notes of the same denomination and design with different kinds and degrees of wear and dirtiness.

In the exemplar layer, each node is adjusted to recognize a respective exemplar, and its parameters are set in dependence only on the exemplar which it is to recognize; its parameters are independent of any other patterns (for the same or different classes) which the network is to recognize.

If the number of inputs to the network is n, then that is the number of inputs to each exemplar node, and that is also the number of weights in each exemplar node. In other words, the input and weights vectors each have n elements. The choice of the components of the weights vector for each exemplar node is extremely simple; for each node, the weights vector is set to be the same as an exemplar, ie the input vector for the "ideal" note which that node is to recognize. The exemplars can therefore be regarded as a training set of vectors. Each Parzen node can implement the function $z=\exp((y-1)/s^2)$, where y is the input signal to the node, z is the output of the node, and $s^2$ (or s) is the parameter of the node.

If we assume that the exemplar and the input vector are both normalized to unit length, then $2(1-y)=(W-X)^2$ where W is the exemplar and X is the input vector. That means that the operand of the Parzen node (ie y−1) is the negative of the square of the distance between the ends of the exemplar and the input vector. The output of the exemplar node, y, is at its maximum, 1, if the input vector matches the exemplar exactly; it decreases as the end of the input vector moves away from the end of the exemplar, at an increasing rate as the distance increases.

The Parzen node forms the exponential of 1−y, which is simply half the square of the distance between the ends of the exemplar and the input vector. The exponential is in fact of −(1−y), and the negative sign means that the output of the Parzen node is at a maximum when the input vector coincides with the exemplar, and decreases as the input vector moves away from the exemplar over the surface of a hypersphere, ie an n-dimensional sphere. The Parzen node output can therefore be regarded as a bell-shaped function (the Gaussian function) projecting from the surface of the hypersphere, with the surface of the hypersphere being the zero or reference surface.

There are typically several exemplars for a given class of pattern, forming a cluster. The ends of these vectors may be arranged roughly symmetrically, but are more likely to form a somewhat irregular shape on the surface of the hypersphere, and can be split into two or more distinct and separate subclusters. For each of these exemplars, the corresponding Parzen node therefore produces a function which has its peak at the end of the exemplar and decreases symmetrically around that peak. The outputs of the Parzen nodes for all the exemplars of a class are summed by a summing node.

The parameter s is a smoothing parameter, which determines the "spread" of the Parzen node output, ie how fast it falls as the angle between the input vector and the exemplar increases. This parameter is preferably chosen so that the output of the summing node for the pattern, ie the sum of the Parzen node outputs for the cluster, is reasonably smooth and flat over the cluster, but falls off reasonably fast beyond the boundary of the cluster.

If the smoothing parameter s is too small, the cluster will tend to break up into separate peaks, with the sum of the Parzen node outputs being small between the peaks; in that case, a pattern which is in the interior of the cluster but is not close to any individual exemplar will produce a small output sum which may not be sufficient to identify the input as belonging to that cluster, ie in that class. If the smoothing parameter is too large, then the sum of the Parzen node outputs will only fall off gradually as the distance from the cluster increases, and input vectors which are a considerable distance from the cluster will be identified as belonging to that cluster (class).

With banknote identification, it is important to detect forged banknotes, as discussed above. This requirement poses a particular difficulty if a PNN network is used, because for the PNN network to detect forged notes, a class could be assigned to the forged notes and a set of exemplars provided to define that class. Alternatively, it may be more convenient to assign several classes to different forms of forgery.

The basic problem is that forged notes are not readily available, which makes it difficult to provide a set of exemplars. Even if a particular type of forgery becomes known, so that a set of exemplars for it can be incorporated in the network, that would only cope with that particular known type of forgery. If another type of forgery became current, then the network would not be able to recognize it. So the network would require updating each time a new type of forgery became known, and it would never be able to cope with new types of forgeries. A technique for defining an "unclassified" or null class is therefore desirable. Note that the classes which the network is designed to recognize are designated the design classes, to distinguish them from the null class.

This null class component density can be thought of as representing the expectation of encountering an input vector in the null class. This null class component density will be flat if the actual distribution of input vectors in the null class is either unknown or irrelevant; but the expectation can be made to depend on the position in the null domain by using a non-uniform density.

SUMMARY OF THE INVENTION

According to the present invention, there is provided a probabilistic neural network including a layer of input nodes, characterized by a layer of exemplar nodes, a layer of non-linear transform nodes having a non-linear transfer function, and a layer of sum nodes, each exemplar node determining the degree of match between a respective exemplar vector and an input vector and feeding a respective primary non-linear transform node, the exemplar and primary non-linear transform nodes being grouped into design classes, with a sum node for each class combining the outputs of the primary non-linear transform nodes for that class, wherein for each primary non-linear transform node there is a secondary non-linear transform node having a transfer function with a lower peak amplitude and a broader spread than the corresponding primary non-linear transform node, fed from the exemplar node for that primary non-linear transform node, and feeding a null class sum node.

A network according to the invention may be termed an Extended Probabilistic Network (PNX network). In informal terms, this PNX network differs from a PNN network by providing for each Parzen node for the design classes (now termed a primary Parzen node), a second (secondary) Parzen node, the secondary Parzen nodes all feeding the null class sum node. Each secondary Parzen node has a Parzen function with a lower peak amplitude and a broader spread than the corresponding primary Parzen node, and is fed from the exemplar node for that primary Parzen node. As will be explained below, the secondary Parzen nodes in effect detect input vectors which are "sufficiently different" from the design classes—that is, null class vectors.

The null class is thus defined not by null class vectors but by reference to the design classes; the PNX network defines the null class more precisely and accurately than by the mere use of a simple uniform null class density, which is the best that can be achieved in the absence of specific knowledge of the nature of the null class.

The two Parzen nodes of each pair, one primary and one secondary, form slightly different Parzen functions from the signals from the exemplar nodes, but the exemplar nodes format the same functions of the input signals for both the Parzen nodes. It is therefore preferable to provide physically separate exemplar and Parzen sublayers as this avoids duplication of the calculation of the exemplar node functions.

If any null class exemplars are available, these can optionally be included in the PNX network as exemplar nodes feeding respective Parzen nodes which feed the null class sum node. The null class Parzen nodes need no qualifying term such as primary or secondary, since there is only the one such node for each null class vector.

It is accordingly an object of the present invention to provide a technique for defining a null domain in a PNN network.

BRIEF DESCRIPTION OF THE DRAWINGS

One embodiment of the present invention will now be described, by way of example, with reference to the accompanying drawings, in which.

DETAILED DESCRIPTION

Figure 1:
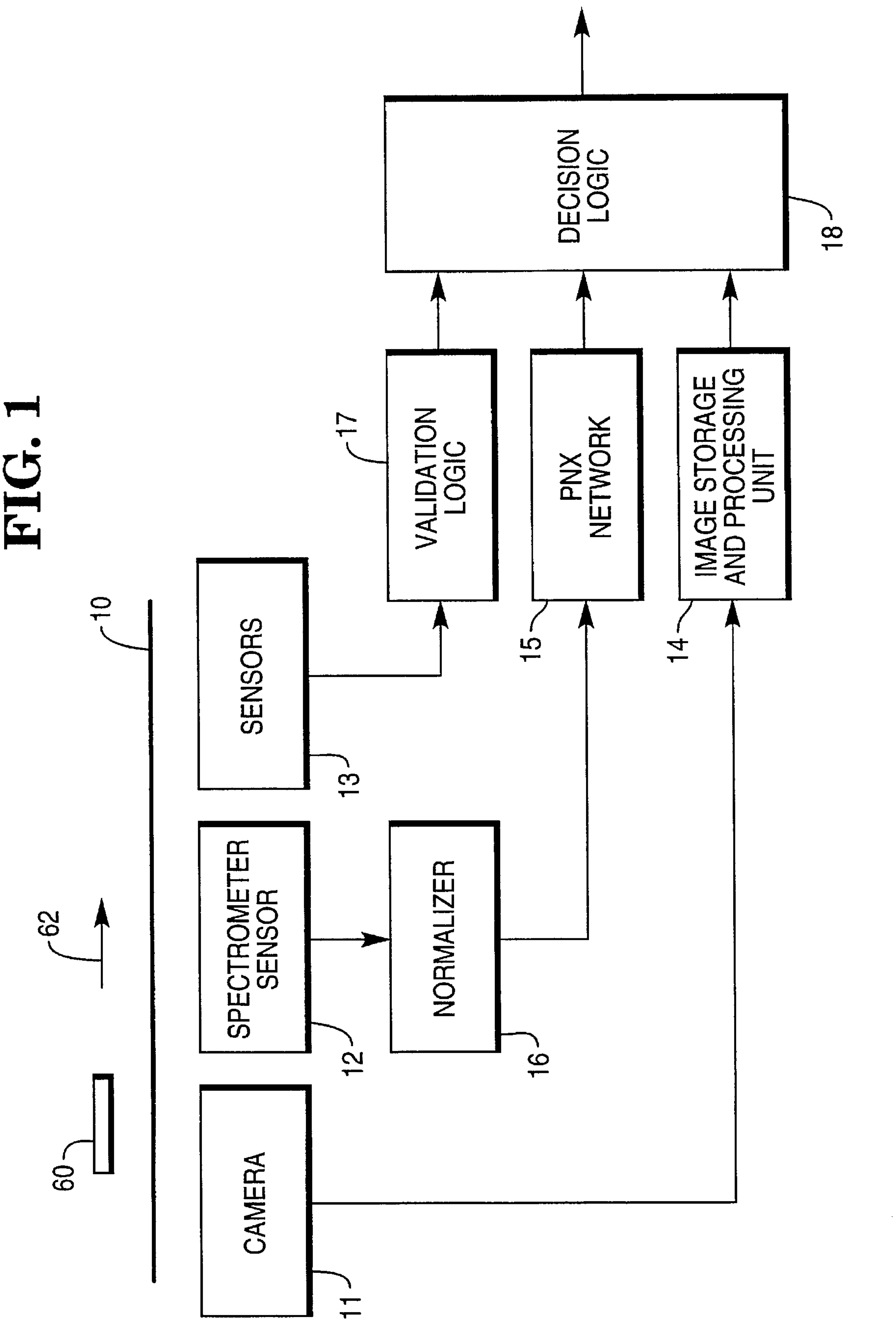
FIG. 1 is a block diagram of a banknote identification system.

Referring to FIG. 1, a banknote identification system comprises a note transport mechanism 10 (shown schematically as a horizontal line) which carries a note 60 to be recognized in the direction of the arrow 62 past three sensing stations 11–13, which feed three parallel channels the outputs of which are combined by a decision logic unit 18. The use of three separate channels, using different types of sensing, increases the confidence level of the final decision.

More specifically, sensing station 11 includes a camera which feeds an image storage and processing unit 14. Sensing station 12 includes a spectrometer sensor which measures the spectral response, at various wavelengths, of light reflected from a plurality of areas on the note, and feeds an Extended Probabilistic Neural Network (PNX) 15 via a normalizing unit 16, which conditions the signals from the sensing station 12 appropriately for the neural network 15. Sensing station 13 comprises means for sensing some further characteristics of the note. such as its fluorescence or magnetic properties, and feeds a validation logic unit 17. The image storage and processing unit 14, the PNX network 15, and the validation logic unit 17 feed a decision logic unit 18, as just noted. The image storage and processing unit 14 captures an image of the banknote 60 and utilizes the captured image for example by extracting features therefrom for processing.

Figure 2:
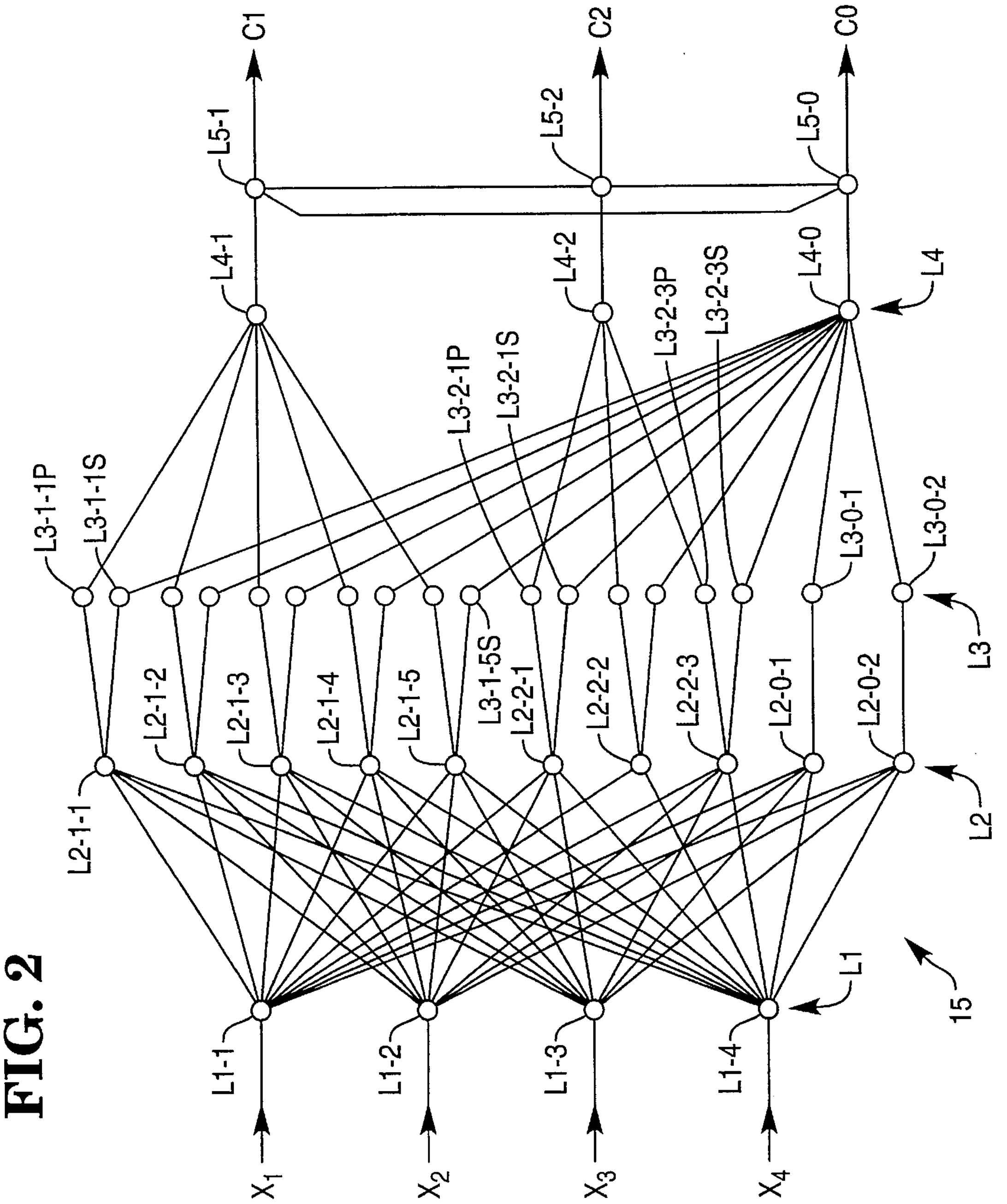
FIG. 2 is a block diagram of the PNX network of the FIG. 1 system.

FIG. 2 is a block diagram of the PNX network 15. The network consists of five layers, L1 to LS, with the nodes in each layer shown as small circles. The network is shown as having four input signals x1 to x4 forming the input vector, two design classes C1 and C2 plus a null class C0, and five exemplars for class C1, three exemplars for class C2, and two exemplars for the null class. The exemplars for the null class are optional, and may be omitted. It will of course be realized that, in practice, the numbers of input signals, classes, and exemplars for each class will generally be considerably larger than the numbers shown here.

In more detail, the input nodes are shown as nodes L1-1 to L1-4. Each of these nodes can consist of a buffer amplifier, coupling its input signal to the exemplar nodes of layer L2, as will be described in more detail hereinafter.

In layer L2, the exemplar nodes are grouped into classes. Class C1 has five exemplar nodes L2-1-1 to L2-1-5, class C2 has three exemplar nodes L2-2-1 to L2-2-3, and the null class has two (optional) exemplar nodes L2-0-1 to L2-0-2. Each of the input nodes of layer L1 is coupled to all of the exemplar nodes of layer L2.

In layer L3, the Parzen nodes, there is a pair of Parzen nodes, a primary node and a secondary node, for each exemplar node for the design classes (classes C1 and C2), and a single Parzen node for each exemplar node (when provided) for the null class CO. Thus taking exemplar node L2-2-3 as a typical node for a design class, this node is coupled to a pair of Parzen nodes, a primary node L3-2-3P and a secondary node L3-2-3S. Taking exemplar node L2-0-1 as a typical exemplar node for the null class, this node is coupled to a single Parzen node L3-0-1.

In layer L4, the sum nodes, there is a sum node for each design class, namely sum nodes L4-1 and L4-2 for the design classes C1 and C2, respectively, and a further sum node L4-0 for the null class CO. Each design class sum node is fed from all the primary Parzen nodes for its design class, and the null class sum node is fed from the Parzen nodes (if any) for the null class and the secondary Parzen nodes of all design classes. Thus sum node L4-1 is fed from the five primary Parzen nodes for class C1, sum node L4-2 is fed from the three primary Parzen nodes for class C2, and sum node L4-0 is fed from ten Parzen nodes—the two Parzen nodes for the null class, the five secondary Parzen nodes for class C 1, and the three secondary Parzen nodes for design class C2.

In layer L5, which is optional, the output nodes, there is an output node for each sum node in layer L4, each fed from the corresponding sum node. Thus there are three output nodes L5-0 to L5-2, fed from the sum nodes L4-0 to L4-2 respectively. All the output nodes are coupled to each other. The output nodes are arranged to select the largest of the signals from the sum nodes.

The output of the PNX network 15 is a set of lines, one for each class, including the null class, just one of which is energized. The PNX network 15 thus both recognizes and authenticates the notes, subject to confirmation by the decision logic 18, which combines the output of the PNX network 15 with the outputs of the image storage and processing unit 14 and the validation unit 17. The note is classified as not authentic if the output of the null class sum node exceeds that of any other sum node. The recognition of the note (assuming it is authentic) is achieved by selecting the largest of the sum layer node outputs. If desired, however, the outputs of the sum layer nodes can be used more directly by the decision logic 18 for recognition, either alone or in combination with other recognition circuitry; or recognition can be performed solely by other recognition circuitry, with the outputs of the non-null class sum nodes being ignored for recognition purposes. With this option, the image storage and processing unit 14 may use features extracted from the stored document image for banknote recognition.

Figure 3:
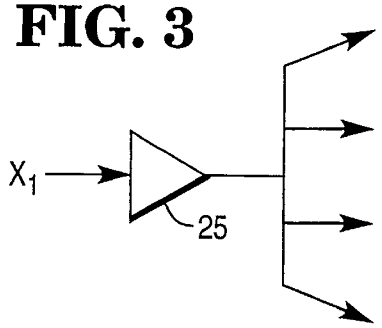
FIGS. 3 to 7 are respectively block diagrams of an input node, an exemplar node, a Parzen node, a sum node, and an output node of the PNX network of FIG. 2.

FIG. 3 is a block diagram of an input node such as node L1-1. As discussed above, this node consists simply of a buffer amplifier 25 with its output fed to all exemplar nodes.

Figure 4:
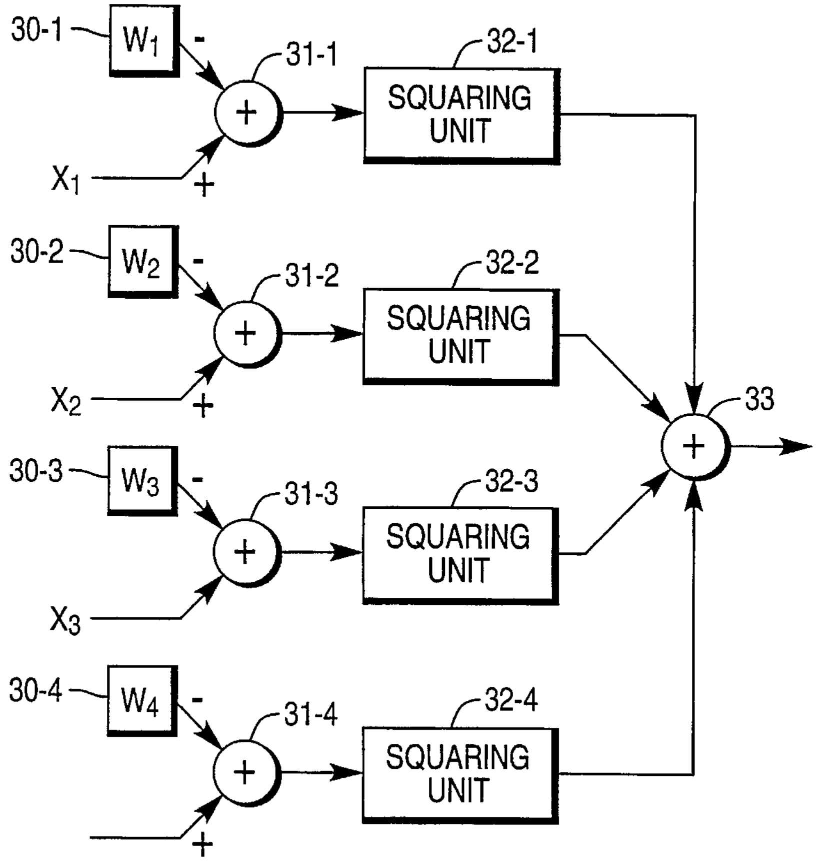

FIG. 4 is a block diagram of an exemplar node such as node L2-1-1. This node consists of a set of four storage elements 30-1 to 30-4, which respectively store the four elements w1 to w4 of the exemplar (weight vector) for that node; a set of four difference elements 31-1 to 31-4, each of which is fed with one of the four elements $x_1$ to $x_4$ of the input vector and the corresponding element of the exemplar and forms the differences between those two elements; a set of four squaring elements 32-1 to 32-4, each of which is fed with the output of a corresponding one of the difference elements 32-1 to 32-4 and forms the square of the output from that difference element; and a summing element 33 which forms the sum of the outputs of the four squaring elements 32-1 to 32-4. This sum of squares is the square of the Euclidean distance between the input vector and the exemplar, that is, $$\sum_{i=1}^{4} (x_i - w_i)^2.$$

It should be noted that in the preferred embodiment the input and exemplar vectors are not normalized to unit magnitude as they are in the PNN network of Specht. This enables the retention of information about the size (magnitude) of the vectors, which is potentially useful. However, in a modification, the vectors are normalized to unit magnitude. This enables a simplification of the exemplar nodes, by eliminating the difference and squaring elements and including a multiplier, having regard to the identity $$\Sigma(x_i - y_i)^2 = \Sigma x_i^2 - 2\Sigma x_i y_i + \Sigma y_i^2.$$

Where the vectors x, y are unit normalized $\Sigma x_i^2 = \Sigma y_i^2 = 1$. These constant terms can be compensated for by constant inputs and the difference and squaring operations replaced essentially by the multiplications $x_i \cdot y_i$.

Figure 5:
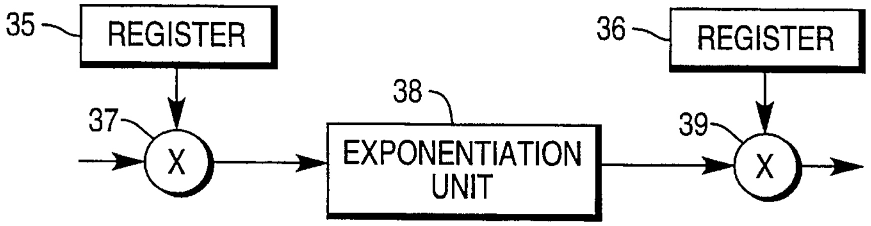

FIG. 5 is a block diagram of a Parzen node such as node L3-2-1P. This node consists of two storage registers 35 and 36 storing respective parameters b and a, a first multiplying element 37 which multiplies the input signal from the associated exemplar node by the parameter b, an exponentiation element 38 which forms the negative exponential of the product from the multiplying element 37, and a second multiplying element 39 which multiplies the signal from the exponentiation element 38 by the parameter a.

The Parzen node implements the function a.exp (−by), where y is the input signal from the associated exemplar node. In the discussion above, the operand was taken as y−1; if the exemplar and input vectors are normalized this is equivalent to y, since the −1 merely represents a factor of 1/e, which can be absorbed into a.

For a primary Parzen node for any design class and any Parzen node for the null class, the parameter b is taken as $1/(\lambda s^2)$, where s is the parameter discussed previously, dependent on the degree of clustering of the exemplars for the class. Specifically, s can be taken as the mean of the Euclidean distances of the nearest M neighbor exemplars for the class. M can conveniently be taken as between N/2 and N/10, where N is the total number of exemplars for the class. M can conveniently be the same for all exemplars for the class, but s is preferably calculated separately for each exemplar. Thus, for each class, s can be calculated relatively easily.

The parameter b is dependent on two parameters, s and λλ, of which s has just been discussed (and is different for each exemplar vector). The parameter λλ is a global parameter, common to all exemplars of a class and to all classes, and allows a global control of the degree of smoothing of what may be called the "circles of influence" of the exemplars and hence of the "zones of influence" of the classes. The term "zones" rather than "circles" of influence is used for the classes, because the exemplars of a class may form an irregular shape. The "ideal" or theoretically correct value for λλ is 2. However, values in the range of roughly 1 to 5 have been found to give successful results.

The parameter a is taken as $1/\sqrt{(\pi.\lambda.s^2)}$, where λ and $s^2$ are the parameters just discussed, so we can take a as $\sqrt{(b/\pi)}$. Strictly speaking this quantity should be raised to the power of n, where n is the dimension (the number of components) of the exemplars. However, n (which is a global constant) is likely to be fairly large, and raising quantities to a high power greatly amplifies the differences between them. It is therefore generally better to take a as just given, without raising it to the power n.

The parameters for the primary Parzen nodes for the design classes and any Parzen nodes for the null class are chosen as discussed above. The secondary Parzen nodes implement the same type of function (a'exp(−b'.y), but with its parameters chosen so that its output is lower than that of the corresponding primary Parzen node for input vectors which are close to the exemplar (good matches), but is higher for input vectors which are some considerable distance from the exemplar (poor matches).

For this, b' is taken as $1/(k.\lambda.s^2)$, and a' is taken as $g\sqrt{(b'/\pi)}$. Here, λ and s are as above, and k and g are global parameters for all null class secondary nodes. The term g is in a sense a "null class gain", which acts as a global threshold or gain parameter which allows control of the relative importance of the design classes and the null class (in contrast to the control of the boundaries of the individual design classes, discussed below). It has been found that values of g between 0.2 and 0.8 generally give the best performance, though 1 can be taken as a default value.

Figure 6:
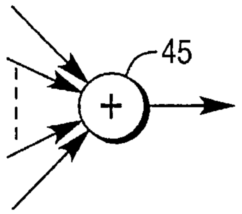

FIG. 6 is a block diagram of a sum node such as node L4-2. This node consists simply of a weighted summing element 45. The weighting will be explained hereinafter. A summing node for a design class is fed from the primary Parzen nodes for its design class. The summing node L5-0 for the null class is fed from the Parzen nodes for the null class (if any), and the secondary Parzen nodes for all design classes.

Figure 8:
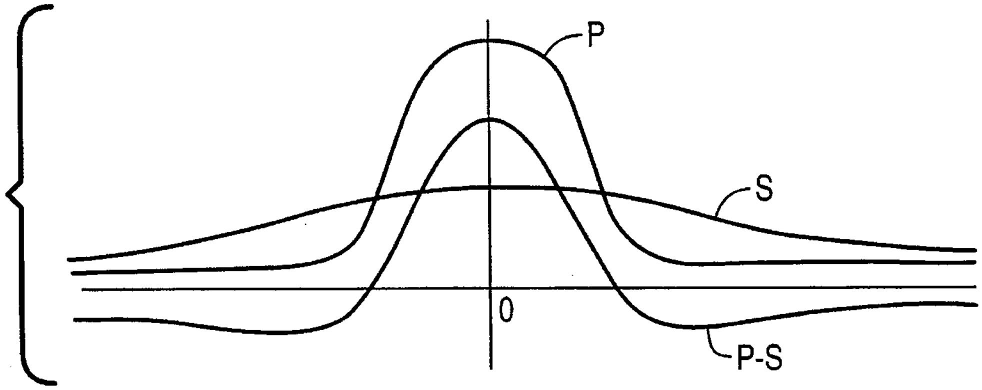
FIG. 8 is a set of graphs illustrating the operation of a primary and secondary Parzen node in the PNX network.

As noted above, the output of a primary Parzen node for a design class can be regarded as a circle of influence. Referring to FIG. 8, the output is a bell-shaped function P centered on the end of the exemplar vector. The circle of influence (not shown) can be taken as the contour at some small but somewhat arbitrary height, for example 1/10 of the peak height. The output of the associated secondary Parzen node is a function S of similar shape, also centered on the end of the exemplar vector. which can be obtained from that of the primary node by compressing it vertically, so that its peak height is less, but expanding it horizontally so that it has a broader spread, i.e. its circle of influence is larger.

If we consider for the moment only a single exemplar, with its design class primary Parzen node and its secondary Parzen node, the sum and output layers of the network will effectively determine which of these two Parzen nodes produces the larger output signal. In other words, the sum and the output layers effectively form the difference P-S (FIG. 8) between the outputs of these two nodes.

This difference—the difference function P-S between the functions of these two nodes—can be informally regarded as an "island" surrounded by a "moat" (as seen in FIG. 8). More precisely, it has the form of a central peak surrounded by sides which slope down to zero level ("sea level"), and then continue (with decreasing slope) below the zero level to a maximum negative value, and finally rise gradually back towards the zero level again. The "moat" actually extends out indefinitely, but it can be regarded as having an ill-defined but finite outer boundary or "shore" at which its depth becomes too small to be significant.

The parameter k controls the degree of dissimilarity between the two functions P and S. The larger the value of k, the lower the peak of the S curve and the more gradual its decrease compared with the P curve. If k is increased, the greater flattening of the S curve will require the value of g to be increased to compensate for the overall reduced response of the secondary Parzen nodes.

In practice, a design class will normally be represented by several exemplars. The sum and output layers of the network will effectively add the outputs of the design class primary Parzen nodes and the secondary nodes, and form the difference between these sums. The result can be (with more informality) regarded as a roughly flat-topped "island", of possibly somewhat irregular shape (formed by the combination of the individual symmetrical bell-shaped islands of the individual exemplars) surrounded by a more or less similarly shaped "moat" (formed by the combination of the individual symmetrical moats around those individual islands).

As noted above, each summing node (FIG. 6) is weighted. This weighting is simply to take account of the fact that different summing nodes are fed by different numbers of Parzen nodes; each summing node has its output weighted by the reciprocal of the number of Parzen nodes feeding it. For the null class summing node, this weighting is in effect combined with the null class gain parameter g, but it is convenient to separate the resultant null class weighting g/N into the two separate factors g and 1/N and to apply these two factors in the Parzen and summing layers respectively. This results in the weighting factors in the summing node layer being chosen uniformly for the design classes and the null class.

Further, in practice there will usually be several different design classes. These can be regarded (with still greater informality) as a number of separate "islands", one for each design class, surrounded by respective "moats" which merge, at their outer edges, into a shallow universal "sea".

If two design classes are close together, then their "islands" can be regarded as merging as far as the null class is concerned. As far as the two design classes themselves are concerned, however, their two "islands" are of course distinct, and the sum and output layers of the PNX network will select whichever of the two design classes has the larger output sum.

For a null class input vector which is a long distance from any design class, the outputs of the secondary Parzen nodes will all be small; that is, the "sea" will be shallow at that point. If desired, a small positive bias can be applied on an input (not shown in FIG. 2) to the sum node L4-0 for the null class, to ensure that a null class output will be reliably generated even for such input vectors.

If we return to the sum of the primary Parzen functions for a design class and the sum of the corresponding secondary Parzen functions rather than the difference between these two sums, the boundary of the design class is the line where these two functions are equal (ie intersect), and the area enclosed by this boundary is the design class. By adjusting the parameters of the secondary Parzen nodes for this design class relative to the primary nodes, the location of this boundary—ie the size of the class—can be adjusted. The effect of this class size adjustment is substantially confined to that class, and has virtually no effect on other classes, provided that the classes are adequately separated. Thus the size of each class can be adjusted. by adjusting the Parzen nodes (primary and secondary) for that class, independently of any adjustments of other classes.

Figure 7:
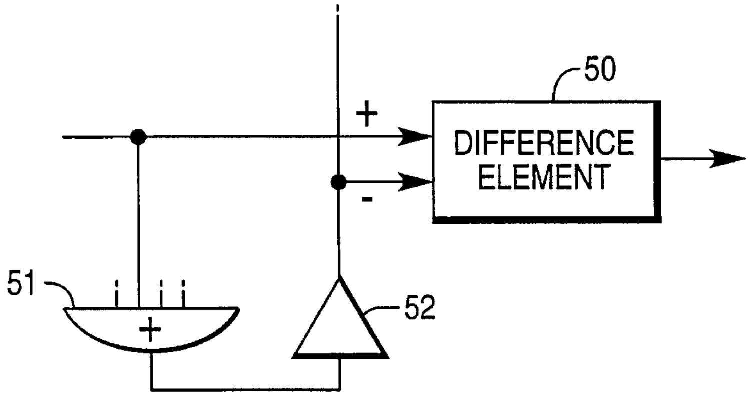

FIG. 7 is a block diagram of an output node such as node L5-2, it being appreciated that, as mentioned hereinabove, the layer L5 is optional. This node consists of a difference element 50 which determines the difference between its two inputs and produces a logical output signal which is 1 if the difference is positive or zero, 0 if the difference is negative. In addition, the set of output nodes have a common circuit consisting of an analog OR gate 51 feeding a buffer 52. The positive inputs of the output nodes are fed with the signals from the respective sum nodes. These signals are also fed to the OR gate 51, the output of which is the largest of these signals and is fed via the buffer 52 to the negative inputs of the difference elements 50 of the output nodes.

It follows that just one of the output nodes will have identical signals at both the positive and negative inputs to its difference element, and so will produce a logical 1 output; every other sum node will have a larger signal at the negative input to its difference element than at its positive input, and so will produce a logical 0 output.

If desired, a small bias can be introduced so that the discrimination level for the difference elements is exactly 0; similarly, logic circuitry can be added to the outputs of the difference elements to prevent more than one 1 output being produced if two or more outputs from the sum nodes are equal.

What is claimed is:

1. A banknote recognition system comprising:

means for measuring a plurality of characteristics of a banknote;

a probabilistic neural network including a layer of input nodes for receiving a number of input signals in which each input signal is represented as an input vector;

the probabilistic neural network including a layer of exemplar nodes in which each exemplar node has an exemplar vector associated therewith and is coupled to each input node;

the probabilistic neural network including a layer of sum nodes including a number of design class sum nodes and a null class sum node;

the probabilistic neural network including a number of primary non-linear transform nodes and a number of secondary non-linear transform nodes corresponding to the number of primary nodes wherein (i) each pair of primary and secondary nodes is fed from a respective exemplar node, (ii) each primary node has a non-linear transfer function with a peak amplitude and a spread and is fed to a design class sum node which combines the outputs of primary nodes for that class, and (iii) each secondary node has a non-linear transfer function with a lower peak amplitude and a broader spread than the corresponding primary node and is fed to the null class sum node; and means for feeding the plurality of characteristics of the banknote to the probabilistic neural network.

2. A banknote recognition system according to claim 1, wherein each of the primary and secondary non-linear transform nodes of the probabilistic neural network is a Parzen node which has an exponential transfer function providing an output which has a maximum value when the input value is zero and which decreases monotonically with increasing input value.

3. A banknote recognition system according to claim 1, further comprising means for normalizing the input vectors of the probabilistic neural network.

4. A banknote recognition system according to claim 3, wherein the null class sum node of the probabilistic neural network includes at least one Parzen node.

5. A banknote recognition system according to claim 1, wherein each exemplar node of the probabilistic neural network implements a Euclidean distance calculation.

6. A banknote recognition system according to claim 1, wherein the null class sum node of the probabilistic neural network has a constant bias signal fed thereto.

7. A banknote recognition system according to claim 1, wherein the probabilistic neural network further comprises an output layer including (i) maximum signal determining means for determining the maximum output signal from the sum nodes, and (ii) a plurality of output nodes, one for each class, including the null class, each of which determines the difference between the output signal from the corresponding sum node and the output of the maximum signal determining means and generates a logic signal dependent on the sign of the difference.

* * * * *